(12) United States Patent
Nergaard et al.

(10) Patent No.: US 8,933,661 B2
(45) Date of Patent: Jan. 13, 2015

(54) INTEGRATED INDUCTIVE AND CONDUCTIVE ELECTRICAL CHARGING SYSTEM

(75) Inventors: Troy A. Nergaard, San Francisco, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 439 days.

(21) Appl. No.: 13/460,202

(22) Filed: Apr. 30, 2012

(65) Prior Publication Data

US 2013/0285602 A1 Oct. 31, 2013

(51) Int. Cl.
*G06F 17/50* (2006.01)

(52) U.S. Cl.
USPC .......................................... 320/108

(58) Field of Classification Search
USPC .......................... 716/100; 320/108
See application file for complete search history.

(56) References Cited

U.S. PATENT DOCUMENTS

| 2012/0025765 A1 | 2/2012 | Frey et al. | |
|---|---|---|---|
| 2012/0037616 A1* | 2/2012 | Kitahara et al. | 219/665 |
| 2012/0153717 A1* | 6/2012 | Obayashi et al. | 307/9.1 |
| 2012/0233062 A1* | 9/2012 | Cornish | 705/39 |
| 2012/0306439 A1 | 12/2012 | Ichikawa et al. | |
| 2013/0313895 A1 | 11/2013 | Asselin et al. | |
| 2014/0055090 A1 | 2/2014 | Krause | |
| 2014/0067660 A1* | 3/2014 | Cornish | 705/39 |
| 2014/0191715 A1* | 7/2014 | Wechlin et al. | 320/108 |
| 2014/0203778 A1* | 7/2014 | Ohnuki | 320/109 |
| 2014/0217966 A1* | 8/2014 | Schneider et al. | 320/108 |

* cited by examiner

*Primary Examiner* — Suchin Parihar
(74) *Attorney, Agent, or Firm* — J. Richard Soderberg

(57) ABSTRACT

An apparatus and method efficiently integrating inductive and conductive charging systems, including embodiments directed towards enabling user selection of either, or both, of conductive and inductive charging. Conductive charging and inductive charging both have, in certain contexts or when judged by different criteria, advantages over the other. Systems and methods relying on one or the other would not have as wide-spread value to a user with opportunities to access both types of charging modalities.

22 Claims, 3 Drawing Sheets

INTEGRATED INDUCTIVE AND CONDUCTIVE ELECTRICAL CHARGING SYSTEM

BACKGROUND OF THE INVENTION

The present invention relates generally to charging an energy storage system, and more particularly but not exclusively, to an integrated charging system employing both conductive and inductive modes.

Many high-performance energy storage solutions now employ series-connected modules that, in turn, are series and parallel combinations of individual battery cells. Battery packs used with electric vehicles store large amounts of energy in a small space, producing high energy densities. The energy is converted into mechanical energy by the power train to move the vehicle, among other uses.

Conventional charging systems employ either a conductive system or an inductive system. For electric vehicle implementations, it has become a current standard to use conductive charging system for transferring energy into the energy storage system. There are some advantages to use of inductive charging systems which has resulted in after-market products to add parallel inductive charging systems.

Electric vehicles are particularly known for having tight budgets on size, weight, and cost, which are often interrelated. Simply adding an entire parallel inductive charging system to a vehicle, either during manufacture or after-market risks degrading performance, safety, and reliability.

What is needed is an apparatus and method for efficiently integrating inductive and conductive charging systems.

BRIEF SUMMARY OF THE INVENTION

Disclosed is an apparatus and method efficiently integrating inductive and conductive charging systems. The present invention includes embodiments directed towards enabling user (or automatic) selection of either, or both, of conductive and inductive charging. Conductive charging and inductive charging both have, in certain contexts or when judged by different criteria, advantages over the other. Systems and methods relying on one or the other would not have as widespread value to a user with opportunities to access both types of charging modalities. Embodiments of the present invention advantageously merge and integrate both modalities to reduce added complexity, size, and weight while preserving efficiency and improving usefulness. Disclosed are systems and methods for integrated conductive and inductive charging. A charging system for an energy storage system of an apparatus includes a conductive rectifier stage wholly disposed on the apparatus, the conductive rectifier stage including a first inverter switching circuit coupled to a first primary winding of an isolation transformer and a first output smoothing circuit coupled to both a first secondary winding of the isolation transformer and to the energy storage system, the conductive rectifier stage rectifying a first AC line voltage conductively received at the apparatus wherein the first inverter switching circuit is responsive to a first control signal; a partial inductive rectifier stage wholly disposed on the apparatus, the partial inductive rectifier stage part of an inductive rectifier stage partially disposed on the apparatus, the inductive rectifier stage including a second inverter switching circuit coupled to a second primary winding of an induction transformer and a second output smoothing circuit coupled to both a second secondary winding of the induction transformer and to the energy storage system, the inductive rectifier stage rectifying a second AC line voltage not conductively received at the apparatus wherein the second inverter switching circuit is wholly disposed off the apparatus and wherein the second inverter switching circuit is responsive to a second control signal; and a controller communicated to the rectifier stages to provide the first control signal and the second control signal.

A charging method for an energy storage system of an apparatus includes a) rectifying a first AC line voltage conductively received at the apparatus using a conductive rectifier stage wholly disposed on the apparatus, the conductive rectifier stage including a first inverter switching circuit coupled to a first primary winding of an isolation transformer and a first output smoothing circuit coupled to both a first secondary winding of the isolation transformer and to the energy storage system wherein the first inverter switching circuit is responsive to a first control signal; b) rectifying a second AC line voltage not conductively received at the apparatus using an inductive rectifier stage partially disposed on the apparatus, the inductive rectifier stage including a second inverter switching circuit coupled to a second primary winding of an induction transformer and a second output smoothing circuit coupled to both a second secondary winding of the induction transformer and to the energy storage system wherein the second inverter switching circuit is wholly disposed off the apparatus and wherein the second inverter switching circuit is responsive to a second control signal; and c) communicating the control signals to the inverter switching circuits from a controller having a master controller wholly disposed on the apparatus.

A charging method for an energy storage system of an apparatus includes a) evaluating whether a conductive rectifier stage wholly disposed on the apparatus is energized from a first AC line voltage wherein the conductive rectifier stage includes a first output smoothing circuit including a plurality of components; b) evaluating whether an inductive rectifier stage partially disposed on the apparatus is energized from a second AC line voltage wherein a second output smoothing circuit of the inductive rectifier stage disposed on the apparatus is coupled to the first output smoothing circuit and shares at least one component of the plurality of components; and c) charging the energy storage system using any rectifier stage that has evaluated as being energized.

Features/benefits include a user to employ any available charging solution, whether it is a conductive charger and/or an inductive charger when charging an energy storage solution such as battery packs used in electric vehicles and similar applications. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus and method for efficiently integrating inductive and conductive charging systems. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
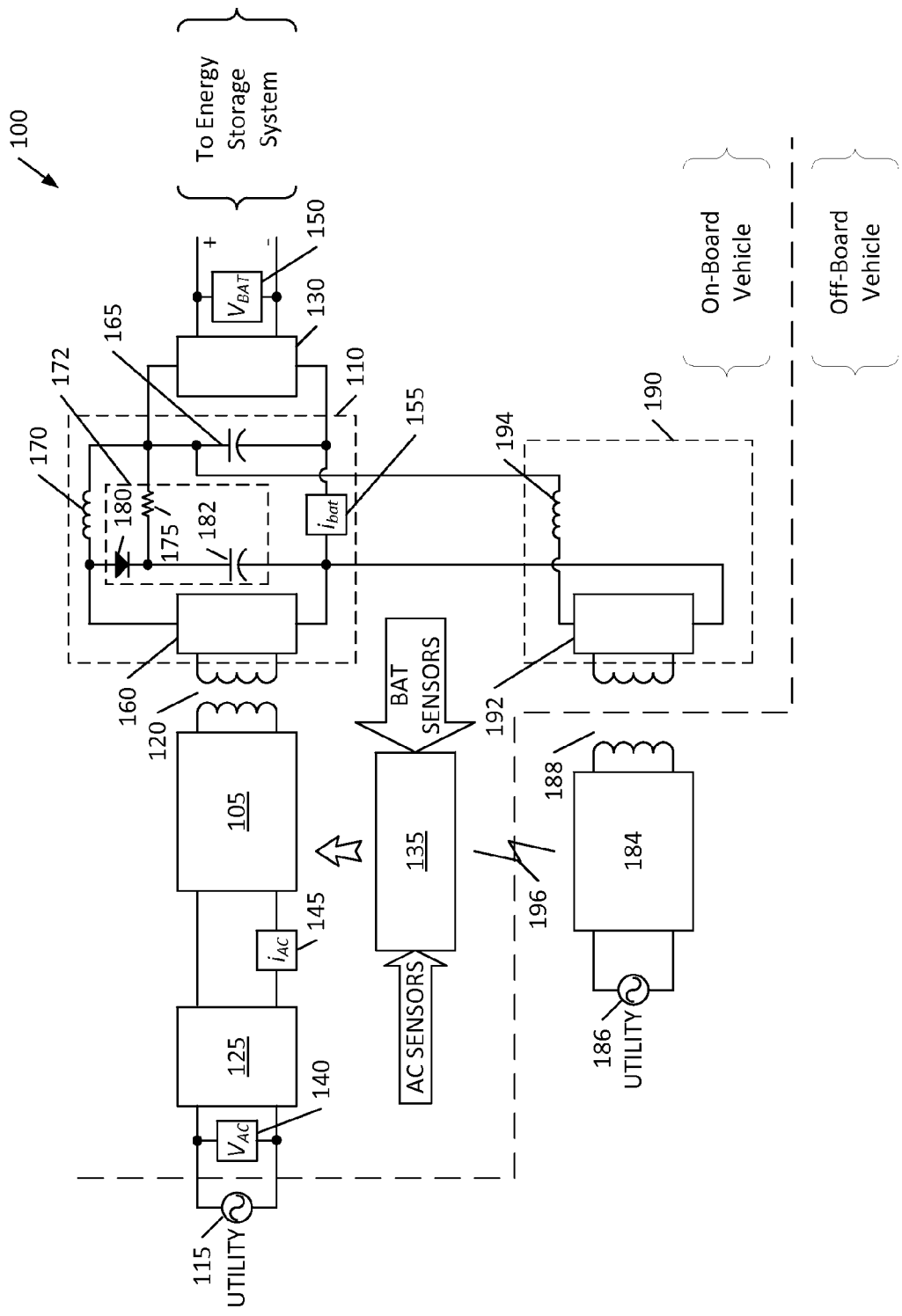
FIG. 1 illustrates a first implementation of an integrated conductive and inductive charging solution.

FIG. 1 illustrates a first implementation of an integrated conductive and inductive charging solution 100. Charging solution 100 includes both a conductive rectifier stage and an inductive rectifier stage that have been integrated together to provide charging energy to an energy storage system (ESS, e.g., a battery, a battery module, a battery pack, and the like). Different embodiments and implementations offer differing levels of integration appropriate for the intended application, some of which are described herein. The conductive rectifier stage includes an inverter switching circuit 105 that operates in conjunction with an output smoothing circuit 110 to produce a steady DC voltage from a first AC line voltage 115. Many implementations include an optional isolation transformer 120 to isolate the DC load of the energy storage system from first AC line voltage 115, particularly those implementations for electric vehicle charging and telecommunications. When employed, a primary winding of isolation transformer 120 is coupled to an output of inverter switching circuit 105 and a secondary winding of isolation transformer 120 is coupled to an input of output smoothing circuit 110.

In addition, many charging solutions include a preconditioner 125 that provides any necessary/desirable switching, electromagnetic interference (EMI) filtering, and other conditioning of first AC line voltage 115 before energizing inverter switching circuit 105. Similarly many charging solutions include a postconditioner 130 that provides any necessary/desirable switching, EMI filtering, and other conditioning of smoothed DC voltage from output smoothing circuit 110 before application to the ESS.

Charging solution 100 further includes a controller 135 that generates appropriate control signals to operate inverter switching circuit 105. There are many different types of inverter switching circuits which will have variations regarding the details of the control signals (e.g., pulse width modulation or other modulation schemes and the like) necessary for their operation, all within the scope of the present invention. Controller 135 employs a set of charging parameters gathered from a sensing system distributed throughout charging solution 100. The set of charging parameters includes $V_{AC}$ for first AC line voltage 115 measured by a voltage sensor 140 and an $I_{AC}$ for current provided by first AC line voltage 115 to inverter switching circuit 105 measured by a current sensor 145. The set of charging parameters further includes $V_{BAT}$ for the ESS measured by a voltage sensor 150 and $I_{BAT}$ for the ESS measured by a current sensor 155.

Output smoothing circuit 110 includes a number of components, and like inverter switching circuit 105, there are many types and topologies of output smoothing circuit 110 which will have variations on the details necessary for their operation, all within the scope of the present invention. In the preferred embodiment, the preferred level of integration and component reuse is in the output smoothing circuits of the rectifier stages as further described herein. Thus a representative output smoothing circuit is described in more detail, with the understanding that other output smoothing circuits may vary slightly or dramatically, and all within the scope of the present invention.

Output smoothing circuit 110 includes a diode bridge 160 having a pair of inputs coupled to the secondary winding and a pair of outputs coupled to opposing terminals of a capacitor 165. A first output of diode bridge 160 is coupled to a first terminal of capacitor 165 through an inductor 170, and a second output of diode bridge 160 is coupled to a second terminal of capacitor 165 through current sensor 155. An optional snubber circuit 172 is coupled between outputs of diode bridge 160 and capacitor 165. There are many different implementations and possible uses of snubber circuit 172, such as providing protection, improving performance, and the like. In charging solution 100, a representative snubber circuit 172 includes a snubber resistor 175 and series-coupled snubber diode 180 (cathode of snubber diode 180 is coupled to snubber resistor 175) is in turn coupled in parallel with inductor 170 to the first output terminal of diode bridge 160 and first terminal of capacitor 165. A snubber capacitor 182 is coupled from the cathode of snubber diode 180 to the second output terminal of diode bridge 160. In some embodiments, diode bridge 160 may be replaced with an active rectifier component or circuit.

The inductive rectifier stage includes an off-board electronics assembly 184 that is energized by a second AC line voltage 186 and is electromagnetically coupled, using an inductive transformer 188, to the ESS. The nature and type of coupling and level of integration varies based upon implementation and application details. Charging solution 100 provides a second inverter switching circuit as part of off-board electronics assembly 184, with the second inverter switching circuit responsive to control signals from controller 135. Charging solution 100 preferably includes at least some minimal secondary/slave controller functions within off-board electronics assembly 184 that is responsive to primary/master controller functions within controller 135. In such a configuration, the controller function is distributed on-board and off-board with primary/master control functions disposed on-board. In some implementations, the on-board and off-board controller functions may be more equivalent or have other cooperative modes, including the off-board controller functions in some situations predominate.

Charging solution 100 is implemented using a second output smoothing circuit 190 coupled to both a secondary winding of induction transformer 188 and to capacitor 165. Output smoothing circuit 190 includes a diode bridge 192 having a pair of inputs coupled to the secondary winding of induction transformer 188 and a pair of outputs coupled to the opposing terminals of capacitor 165. A first output of diode bridge 192 is coupled to the first terminal of capacitor 165 through an inductor 194, and a second output of diode bridge 192 is coupled to the second terminal of capacitor 165 through current sensor 155.

It is a feature of charging solution 100 that the conductive rectifier stage is wholly disposed on the apparatus with the ESS (e.g., an electric vehicle) while a portion of the inductive rectifier stage is disposed on the apparatus and a portion disposed off the apparatus. Each rectifier stage is shown with its own energizing AC line voltage, but in some cases it may be that these AC line voltages are shared. The AC line voltages may be single-phase or multiphase, and may be the same voltage level (e.g., 110 VAC, 220 VAC, or the like) or provide different energization voltages (e.g., 220 VAC for first AC line voltage 115 and 110 VAC for second AC line voltage 186) and currents (e.g., 16 A and 40 A respectively). It is a feature of charging solution 100 that controller 135 provides operational control over both inverter switching circuits. Controller 135 is disposed on the apparatus, and in the preferred embodiments wholly disposed on the apparatus. In some implementations, some controller functions specifically required for the inductive rectifier stage or other feature may be incorporated into off-board electronics assembly 184. Controller 135 and off-board electronics assembly 184 preferably include wireless communication modules enabling bidirectional data flow through a wireless link 196. The data flow includes instructions for the inverter switching circuit and a set of sensor parameters for second AC line voltage 186, including $V_{AC}$ and $I_{AC}$. In some implementations, controller 135 may provide battery sensor data and other operational information and off-load some tasks to off-board electronics assembly 184. Off-board electronics assembly 184 may, in some configurations, provide higher level data, such as power available, time to complete charge, and the like, or provide information that controller 135 establishes this information.

Operation of charging solution 100 will be described in a specific narrow context as an aid to understanding the present invention. The present invention includes this context, as well as other contexts. Charging solution 100 is included as part of an EV and uses the conductive rectifier stage as a primary charging modality. As is well-known, a user mates a physical power connector coupled to an energy source, utility grid power or the like to a complementary physical power connector on the apparatus to enable charging. Controller 135 operates inverter switching circuit 105 to produce an appropriate AC voltage level and output smoothing circuit 110 rectifies and smoothes this voltage to the desired DC voltage which is applied to the ESS for charging.

This is often sufficient for many applications, but it does require some work on the part of the user to engage the physical power connector and to actuate the charging process. As charging stations continue to proliferate, some will be installed with inductive charging capacity. This will be true for both private and public charging stations. In either case, when the EV is enabled for inductive charging in addition to the conductive charging capability, this provides more options to the user. It is often true that inductive charging systems are less efficient, though they can be more convenient for the user. Less efficiency typically means that, holding other variables and conditions constant, it will take longer to charge the ESS to a desired level using inductive charging than would be the case using conductive charging. In some cases this may not be inconvenient to the user, such as when a standard overnight charge at inductive charging efficiency sufficiently charges the ESS. The user is able to install off-board electronics assembly 184 in the floor of a garage, for example, drive over the off-board electronics, and initiate (automatically or manually) a charging process that will be complete the next time the EV is to be driven.

In a public charging station scenario, it can be the case that the charging station includes both a conductive charging bay as well as an inductive charging bay. The user is able to select either bay in the event one or both are open, or select a queue that represents the shortest-time-to-charge based upon efficiency and number of preceding vehicles in each queue.

Even when the user chooses conveniences associated with inductive charging, charging solution 100 enables the user in any of the scenarios to choose conductive charging as appropriate. This could be the case when the user, after initiating inductive charging, realizes that an unexpected use is required of the EV, and the inductive charging solution will not sufficiently charge the ESS before the EV is needed. The user is able to engage the conductive charging capacity and have the EV ready when needed.

In these scenarios, independent, non-concurrent operation of the rectifier stages is described. In some embodiments, it is possible for the user to energize both rectifier stages concurrently and achieve even greater charging speed. These various scenarios are preferably tuned and optimized by adjusting components of the output smoothing circuits.

A critical component of the output smoothing circuits for concurrent operation are the inductors (i.e., inductor 170 and inductor 194). In FIG. 1, each smoothing circuit has its own inductor (i.e., inductor 170 and inductor 194) that is sized to store and discharge energy responsive to a maximum instantaneous power provided by each output smoothing circuit, without concurrent operation of the rectifier stages. By doing this, each rectifier stage is able to operate concurrently and independently, each inductor sized properly. As noted herein, typically inductive rectification is less efficient than conductive rectification. In such cases, when each rectifier stage is energized by similar AC line voltages, inductor 194 may be sized smaller (and thus be less costly) than inductor 170. It should be noted that in some implementations, charging solution 100 dispenses with inductor 170 and inductor 194.

In some implementations it is necessary or desirable to use a single inductor yet enable the possibility of concurrent operation. In such cases it is possible to eliminate inductor 194 by increasing the size of inductor 170 to store/discharge a maximum instantaneous power provided by both output smoothing circuits. It may be less costly, or otherwise advantageous, to use a single larger inductor than two smaller inductors. Of course, elimination of inductor 194 may require rerouting of the connections shown to properly use inductor 170 with output smoothing circuit 190.

In other implementations it is necessary or preferable to prevent both rectifier stages from operating concurrently. In such cases it is also possible to use a single shared inductor, but it need be sized based upon the maximum instantaneous power of the output smoothing circuit discharging the greatest instantaneous power. Typically this will be the output smoothing circuit associated with the conductive rectifier stage.

Figure 2:
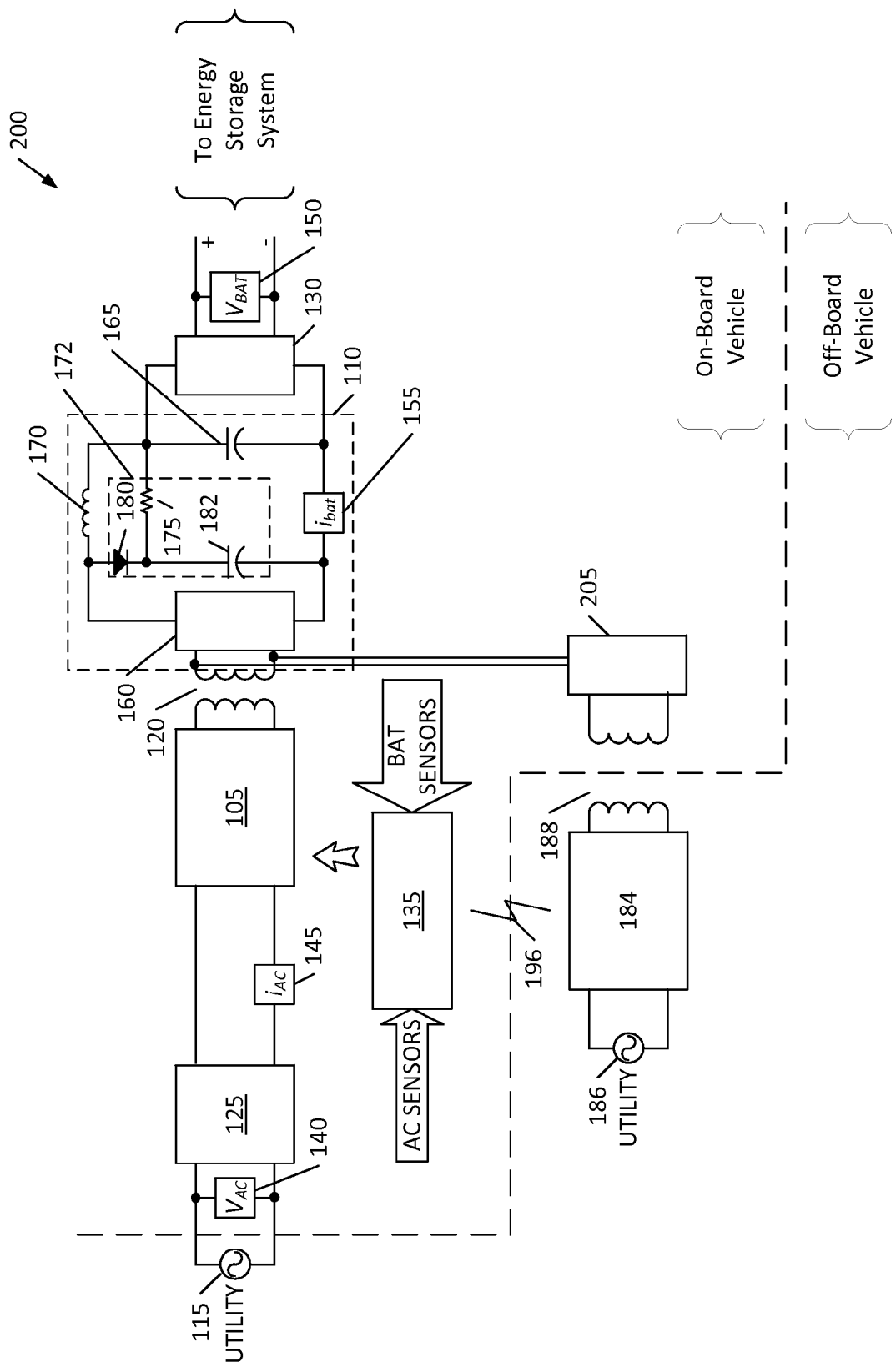
FIG. 2 illustrates a second implementation of an integrated conductive and inductive charging solution.

FIG. 2 illustrates a second implementation of an integrated conductive and inductive charging solution 200. Charging solution 200 substitutes a modified output circuit 205 of the inductive rectifier stage for output smoothing circuit 190 shown in FIG. 1. Output circuit 205 is coupled directly to the secondary winding of isolation transformer 120 at the inputs of diode bridge 160. Output circuit 205 of the preferred embodiment includes a power connector and relays/contactors that selectively couple the secondary winding of inductive transformer 188 to diode bridge 160. In some cases, it may be necessary or desirable to provide an additional set of relays coupled to the secondary winding of isolation transformer 120 to not short inductive transformer 188 during inductive charging. This configuration uses output smoothing circuit 110 for both rectifier stages. Note that in this configuration implementation there is no concurrent operation of the rectifier stages. In some instances it may be possible to enable concurrent operation by adjustment to one or both of the output circuits. Other arrangements and intercoupling of components in the stages are also possible in other embodiments to share differing numbers of components, based upon needs, performance, and resource costs.

Figure 3:
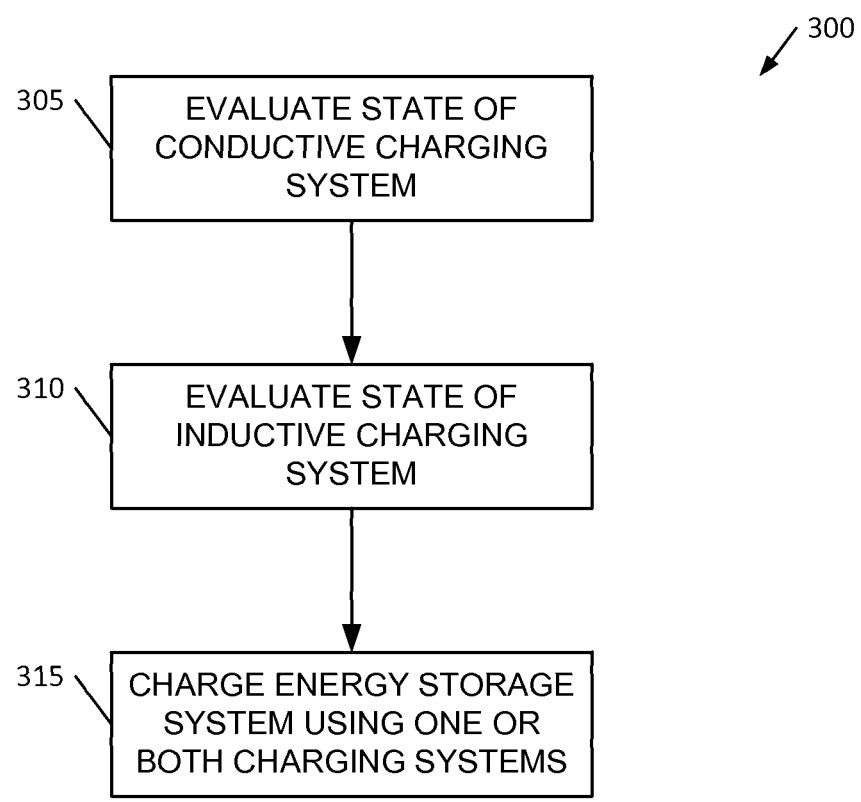
FIG. 3 illustrates a charging process for an integrated conductive and inductive charging solution.

FIG. 3 illustrates a charging process 300 for an integrated conductive and inductive charging solution. Process 300 is preferably implemented automatically by controller 135 (typically with cooperation from controller functions disposed in off-board electronics assembly 184). Process 300 evaluates whether the conductive rectifier stage is energizable at step 305 and evaluates whether the inductive rectifier stage is energizable at step 310. Finally at step 315 process 300 energizes any (or both) rectifier stages that are energizable, as appropriate.

There are many different topologies and configurations for rectifier stages in general and the inverter switching circuits and output smoothing circuits specifically. The present invention is adaptable to many, if not all of these, and offers conveniences and flexibility to users. The present invention is not limited to mobile apparatus having rechargeable energy storage systems. There are mobile inductive charging stations that employ paddles, for example, that could be used in cooperation with a non-mobile apparatus having a primary conductive rectifier stage.

An aspect of the present invention addresses efficiently coupling the off-board electronics assembly to the apparatus and improve inductive charging efficiency. The off-board electronics assembly may be integrated into a floor of charging station, or may be disposed on the floor and a ramp provided to aid in alignment. In some implementations, particularly for public charging stations, robotic systems may move and reposition the off-board electronics assembly to optimize electromagnetic coupling. Those robotic systems may be disposed in the charging station, the vehicle, or both.

The systems and methods are preferably implemented using a microprocessor executing program instructions from a memory, the instructions causing the apparatus to perform as described herein. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A charging system for an energy storage system of an apparatus, comprising:

a conductive rectifier stage wholly disposed on the apparatus, said conductive rectifier stage including a first inverter switching circuit coupled to a first primary winding of an isolation transformer and a first output smoothing circuit coupled to both a first secondary winding of said isolation transformer and to the energy storage system, said first output smoothing circuit including a first inductance, said conductive rectifier stage rectifying a first AC line voltage conductively received at the apparatus wherein said first inverter switching circuit is responsive to a first control signal;

a partial inductive rectifier stage wholly disposed on the apparatus, said partial inductive rectifier stage part of an inductive rectifier stage partially disposed on the apparatus, said inductive rectifier stage including a second inverter switching circuit coupled to a second primary winding of an induction transformer and a second output smoothing circuit coupled to both a second secondary winding of said induction transformer and to the energy storage system, said inductive rectifier stage rectifying a second AC line voltage not conductively received at the apparatus wherein said second inverter switching circuit is wholly disposed off the apparatus and wherein said second inverter switching circuit is responsive to a second control signal; and a controller communicated to said rectifier stages to provide said first control signal and said second control signal.

2. The charging system of claim 1 wherein said controller includes a master controller and a slave controller, said master controller communicated to said conductive rectifier stage to provide said first control signal and wirelessly communicated to said slave controller wherein said slave controller is communicated to said second inverter switching circuit to provide said second control signal wherein said master controller is disposed on the apparatus and said slave controller is disposed off the apparatus.

3. The system of claim 1 wherein said inverter switching circuits each include a plurality of semiconductor power switching devices and wherein said control signals include modulation control signals for said plurality of semiconductor power switching devices.

4. The system of claim 1 further comprising an electromagnetic interference (EMI) filter coupled between said output smoothing circuits and the energy storage system.

5. The system of claim 1 wherein said first output smoothing circuit includes a smoothing capacitance in parallel with the energy storage system.

6. The system of claim 5 wherein said second output smoothing circuit is coupled in parallel to both said first output smoothing circuit and to said smoothing capacitance.

7. The system of claim 6 wherein each said output smoothing circuit includes a diode bridge coupled in parallel to said smoothing capacitance.

8. The system of claim 1 further comprising a snubber circuit coupled to both said output smoothing circuits.

9. The system of claim 6 further comprising a snubber circuit coupled to both said output smoothing circuits.

10. The system of claim 1 wherein said second output smoothing circuit includes said first inductance, wherein said first output smoothing circuit provides a first quantity of instantaneous power, wherein said second output smoothing circuit provides a second quantity of instantaneous power and wherein said first inductance is sized to store a maximum of a sum of said quantities of instantaneous power from both said rectifier stages when both said rectifier stages are operated concurrently.

11. The system of claim 1 wherein said second output smoothing circuit includes said first inductance, wherein said first output smoothing circuit provides a first quantity of instantaneous power, wherein said second output smoothing circuit provides a second quantity of instantaneous power and wherein said first inductance is sized to store a maximum instantaneous power of either of said quantities of instantaneous power from said rectifier stages when said rectifier stages are operated non-concurrently.

12. The system of claim 1 wherein said second output smoothing circuit includes a second inductance.

13. The system of claim 12 wherein said first output smoothing circuit provides a first quantity of instantaneous power, wherein said second output smoothing circuit provides a second quantity of instantaneous power, wherein said first inductance is sized to store a maximum of said first quantity of instantaneous power, and wherein said second inductance is sized to store a maximum of said second quantity of instantaneous power.

14. The system of claim 2 further comprising a sensing system collecting a first set of charging parameters and wherein said controller is responsive to said first set of charging parameters when providing said control signals.

15. The system of claim 14 wherein said sensing system includes a first AC voltage sensor coupled to said first AC line voltage, a first AC current sensor coupled between said first AC line voltage and said first inverter switching circuit, a battery current sensor coupled to said first output smoothing circuit, and a battery voltage sensor coupled to the energy storage system.

16. The system of claim 15 wherein said controller wirelessly receives a second set of charging parameters from said inductive rectifier stage.

17. The system of claim 1 further comprising a power connector and a relay directly coupling said second secondary winding to said first secondary winding.

18. A charging method for an energy storage system of an apparatus, the method comprising the steps of:
  a) rectifying a first AC line voltage conductively received at the apparatus using a conductive rectifier stage wholly disposed on the apparatus, said conductive rectifier stage including a first inverter switching circuit coupled to a first primary winding of an isolation transformer and a first output smoothing circuit coupled to both a first secondary winding of said isolation transformer and to the energy storage system, said first output smoothing circuit including a first inductance, wherein said first inverter switching circuit is responsive to a first control signal;
  b) rectifying a second AC line voltage not conductively received at the apparatus using an inductive rectifier stage partially disposed on the apparatus, said inductive rectifier stage including a second inverter switching circuit coupled to a second primary winding of an induction transformer and a second output smoothing circuit coupled to both a second secondary winding of said induction transformer and to the energy storage system wherein said second inverter switching circuit is wholly disposed off the apparatus and wherein said second inverter switching circuit is responsive to a second control signal; and
  c) communicating said control signals to said inverter switching circuits from a controller having a master controller wholly disposed on the apparatus.

19. A charging method for an energy storage system of an apparatus, the method comprising the steps of:
  a) evaluating whether a conductive rectifier stage wholly disposed on the apparatus is energized from a first AC line voltage wherein said conductive rectifier stage includes a first output smoothing circuit including a plurality of components, said first output smoothing circuit including a first inductance;
  b) evaluating whether an inductive rectifier stage partially disposed on the apparatus is energized from a second AC line voltage wherein a second output smoothing circuit of said inductive rectifier stage disposed on the apparatus is coupled to said first output smoothing circuit and shares at least one component of said plurality of components; and
  c) charging the energy storage system using any rectifier stage that has evaluated as being energized.

20. A charging system for an energy storage system of an apparatus, comprising:
  a conductive rectifier stage wholly disposed on the apparatus, said conductive rectifier stage including a first inverter switching circuit coupled to a first primary winding of an isolation transformer and a first output smoothing circuit coupled to both a first secondary winding of said isolation transformer and to the energy storage system, said conductive rectifier stage rectifying a first AC line voltage conductively received at the apparatus wherein said first inverter switching circuit is responsive to a first control signal;

a partial inductive rectifier stage wholly disposed on the apparatus, said partial inductive rectifier stage part of an inductive rectifier stage partially disposed on the apparatus, said inductive rectifier stage including a second inverter switching circuit coupled to a second primary winding of an induction transformer and a second output smoothing circuit coupled to both a second secondary winding of said induction transformer and to the energy storage system, said inductive rectifier stage rectifying a second AC line voltage not conductively received at the apparatus wherein said second inverter switching circuit is wholly disposed off the apparatus and wherein said second inverter switching circuit is responsive to a second control signal;

a controller communicated to said rectifier stages to provide said first control signal and said second control signal, said controller including a master controller and a slave controller, said master controller communicated to said conductive rectifier stage to provide said first control signal and wirelessly communicated to said slave controller wherein said slave controller is communicated to said second inverter switching circuit to provide said second control signal wherein said master controller is disposed on the apparatus and said slave controller is disposed off the apparatus; and a sensing system collecting a first set of charging parameters and wherein said controller is responsive to said first set of charging parameters when providing said control signals.

21. The system of claim 20 wherein said sensing system includes a first AC voltage sensor coupled to said first AC line voltage, a first AC current sensor coupled between said first AC line voltage and said first inverter switching circuit, a battery current sensor coupled to said first output smoothing circuit, and a battery voltage sensor coupled to the energy storage system.

22. The system of claim 21 wherein said controller wirelessly receives a second set of charging parameters from said inductive rectifier stage.

* * * * *